3,003,742
LIFT GATE VALVE
Michael I. Kearns, 1858 Norfolk, Houston, Tex.
Filed Mar. 17, 1960, Ser. No. 15,673
13 Claims. (Cl. 251—167)

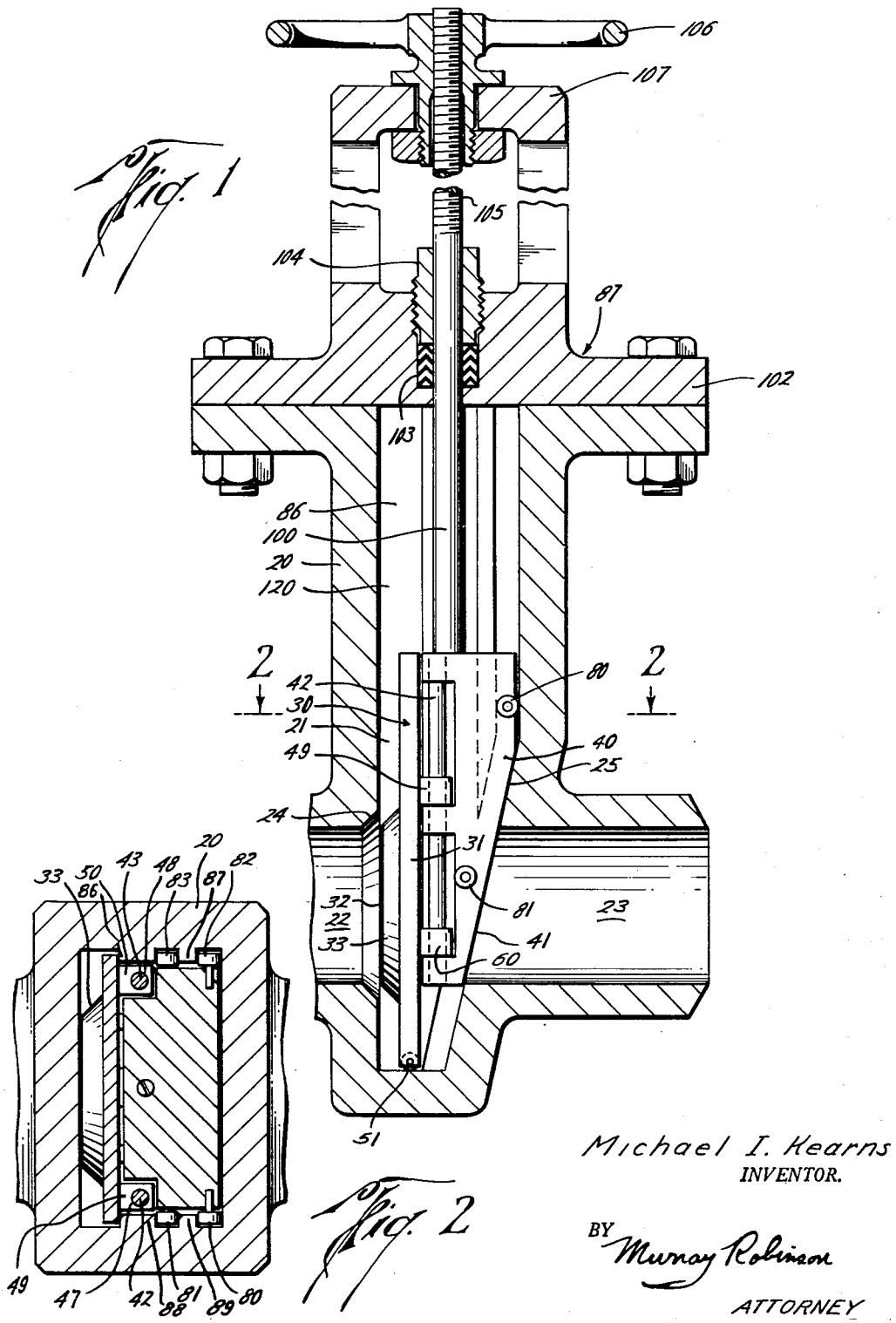

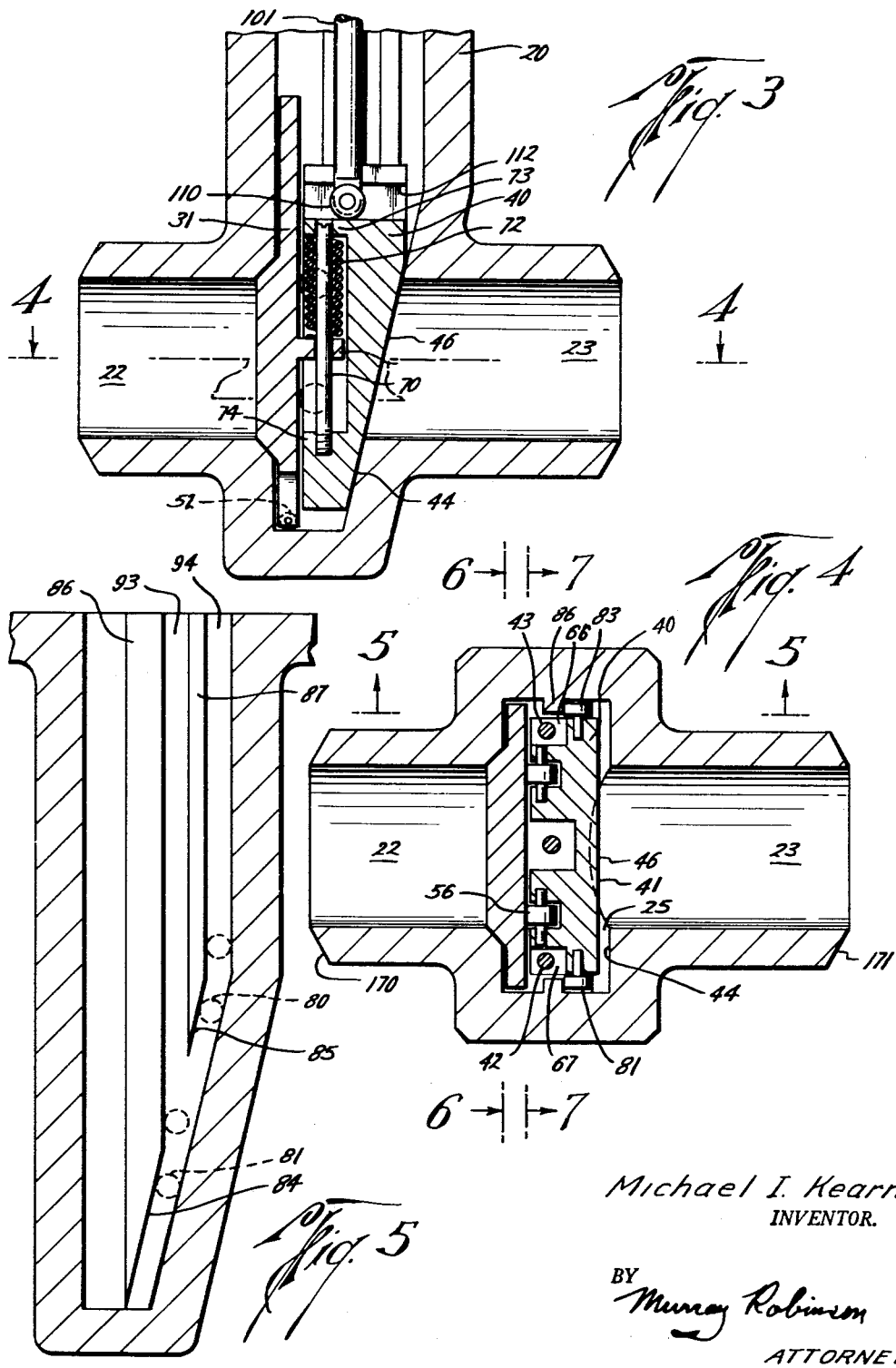

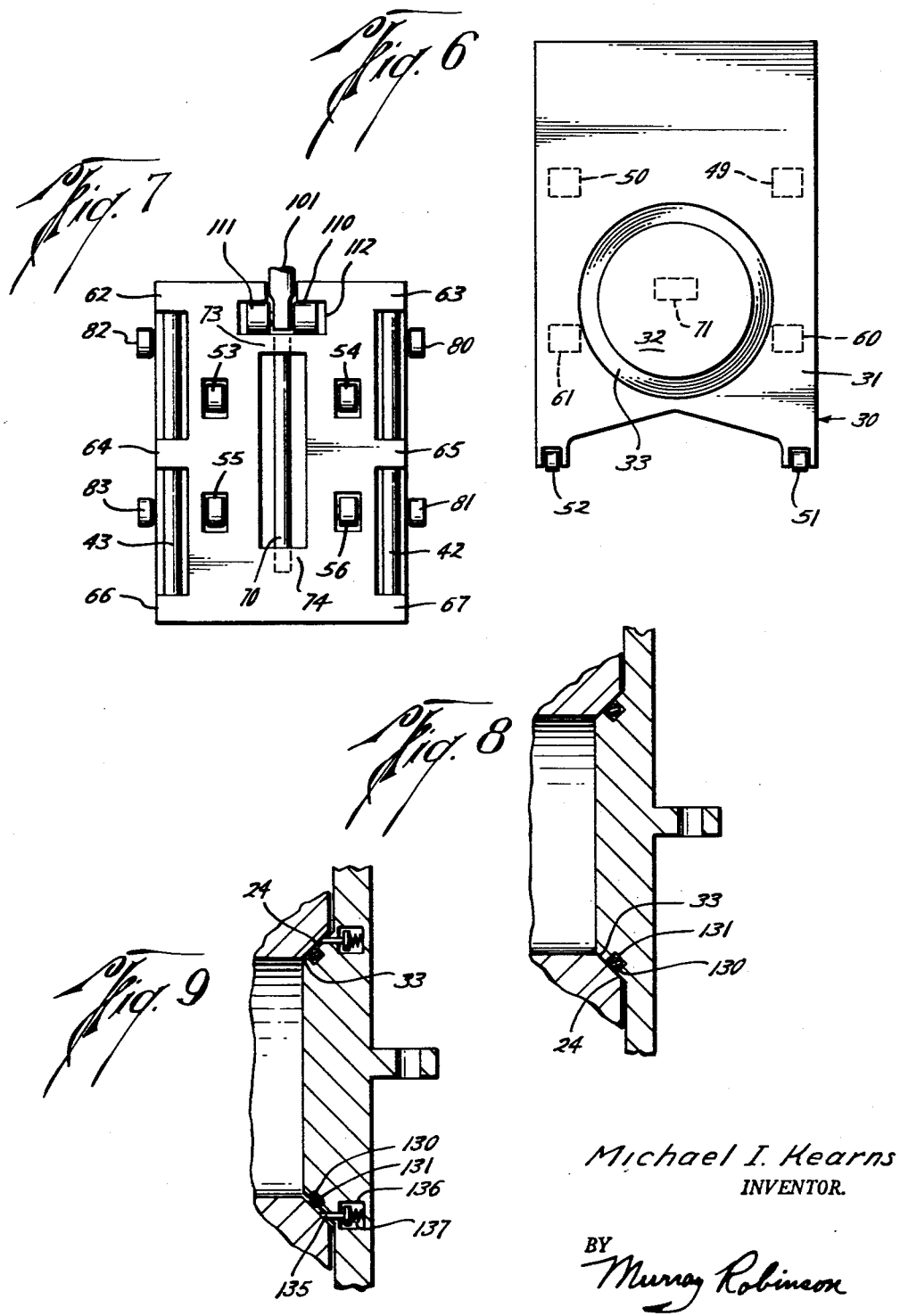

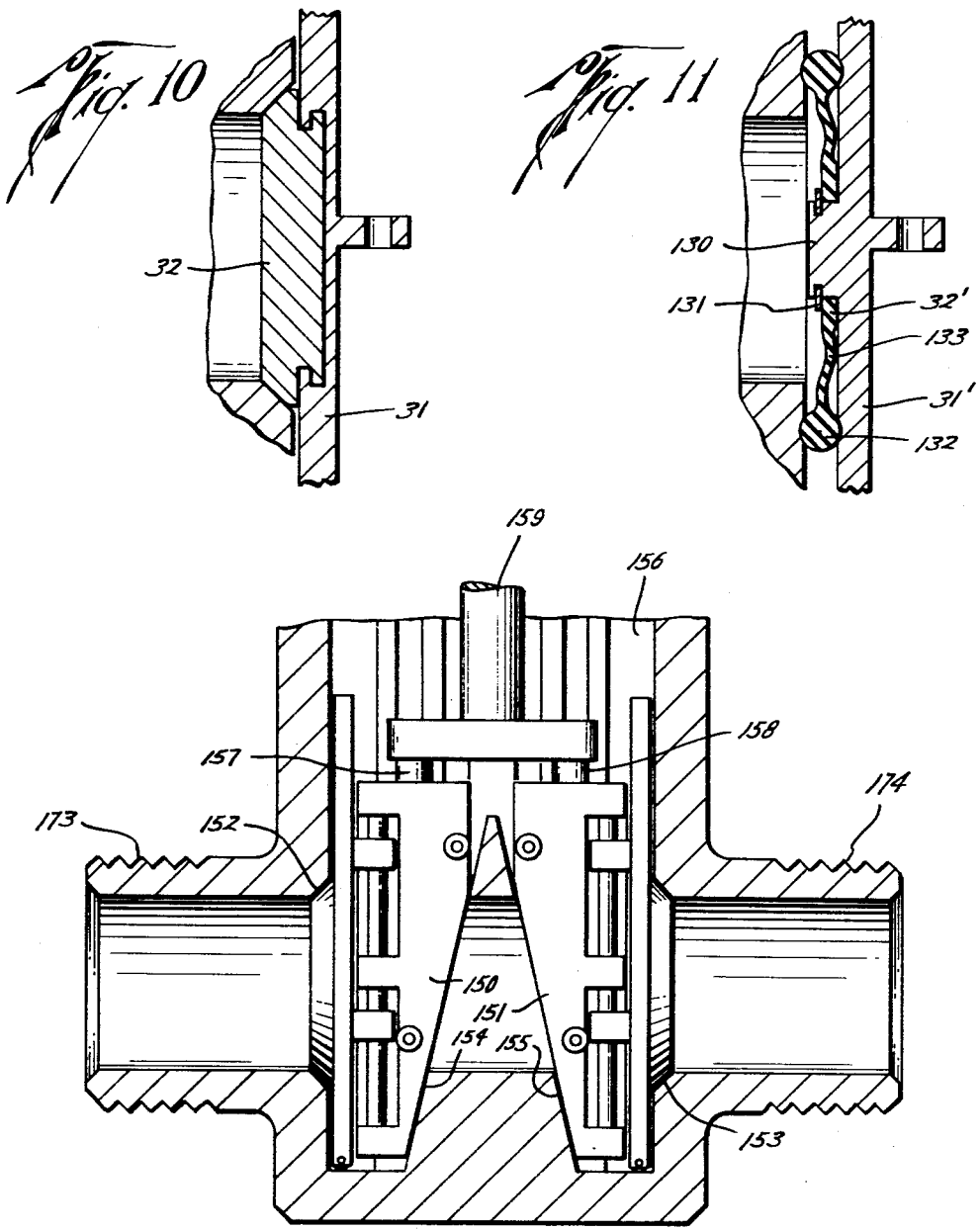

This invention pertains to valves. Briefly, the invention contemplates a combination lift gate valve in which the closure moves parallel to the flow path through the seat between a closed position and an unseated position in which the closure is still, at least partially, in the direct path of flow between the valve inlet and outlet, and in which the closure is moved transverse to said flow path between said unseated position and an open position out of said flow path. The movement between unseated and closed position is accomplished with wedge means to cause the closure to seat tightly. Preferably there is a second closure associated with the wedge means to cooperate with a set around a different flow port than the first mentioned closure, whereby both upstream and downstream ports are closed; alternatively there may be provided a second wedge means and second closure duplicating the first closure and wedge means and cooperating with the second part whereby both upstream and downstream ports are closed. Specific forms of closure means are used as well as specific forms of actuator means for moving the closure between closed, unseated, and open positions.

For a detailed description of the invention, from which the advantages thereof will appear, reference will now be made to the following drawings wherein:

FIGURE 1 is a section through the valve in the unseated position taken in the plane of the flow axis and stem axis, which for convenience may be called a vertical axial plane, although the valve can be used in any position;

FIGURE 2 is a section taken on plane 2—2 indicated in FIGURE 1;

FIGURE 3 is a view similar to FIGURE 1 showing the valve in the closed position, the closure being shown in section too rather than in elevation;

FIGURE 4 is a section taken on the plane 4—4 indicated in FIGURE 3;

FIGURE 5 is a section taken on the plane 5—5 indicated in FIGURE 4;

FIGURES 6 and 7 are views of portions of the apparatus viewed as indicated by lines 6—6 and 7—7 in FIGURE 4;

FIGURES 8, 9, 10, and 11 are sectional views in the same plane as FIGURE 3 showing modified forms of closures; and FIGURE 12 is a vertical section similar to FIGURE 3 showing a modified form of valve.

Referring to FIGURE 1 there is shown a valve comprising wall means 20 defining a chamber 21, the wall means having a plurality of openings 22, 23 therethrough providing inlet and outlet openings for the valve, the valve being reversible so that either opening may be the inlet and the other the outlet. Around opening 22 is a conical recessed area 24 forming a first seat. The area 25 around opening 23 also forms a second seat.

There is a first closure means 30 for blocking flow through opening 22. The first closure means comprises a back-up element 31 and a protuberant closure element 32 having a conical periphery 33 engageable with the first seat 24 as shown in FIGURE 3.

Actuator means for moving the closure means between closed, unseated, and open positions includes wedge means 40 for moving the closure means from unseated to closed position. Wedge means 40 has a first bearing means comprising plane surface 41 (see FIGURES 1 and 4) and a second bearing means acute angularly disposed relative to the plane surface 41 and comprising the portions of the surfaces of rods 42, 43 that face closure means 30. The first bearing means cooperates with a third bearing means comprising the sloping area 44 on the interior of the wall means 20. Area 44 may be in the same plane as seat areas 25, and the portion 46 of the wedge means blocking opening 23 and engaging with seat 25 forms a second closure means. A fourth bearing means comprises the portions of the surfaces of apertures 47, 48 in ears 49, 50, which surface portions face the wedge means. The fourth bearing means engages with the second bearing means provided by the rods 42, 43. It will be apparent that as the wedge means is lowered, the first bearing means thereon will meet or come to and slide along the third bearing means provided by the wall means (body) of the valve and since at that instant closure means 30 will reach the bottom of its travel further force lowering the wedge will cause the wedge means to move to the left as viewed in the drawings. This will cause the second bearing means (rod surfaces) on the wedge means to press against the fourth bearing means (ear aperture surfaces) and the first closure means, thereby moving it from the unseated position shown in FIGURE 1 to the closed position shown in FIGURE 3. Antifriction means such as rollers 51, 52 (see especially FIGURE 6) may be provided to facilitate this movement of the first closure means relative to the wall means (body) of the valve. Antifriction means such as rollers 53, 54, 55, 56 (see especially FIGURE 7) may be provided to facilitate the relative movement of the first closure means relative to the wedge means.

The actuator means further comprises means controlling the motion of the first closure means from closed to unseated position including connecting means connecting the first closure means to the wedge means with the second and fourth bearing means in engagement and providing a limited amount of lost motion between the closure means and wedge means with respect to relative motion in the direction of relative sliding of the second and fourth bearing means. This connecting means comprises the remaining portions of the surfaces of the rods 42, 43 and of the apertures in ears 49, 50. In other words when the wedge means is moved upwardly and in engagement with the sloping surface 44, it moves to the right and the rods 42, 43 pull the closure means to the right, the pressure of the rods against the ears being in the opposite direction and hence on opposite portions of the surfaces thereof then during the movement from unseated to closed position. Although in the preferred embodiment shown, the connecting means between the wedge means and first closure means used to lift the first closure means off its seat are thus intimately associated with the second and fourth bearing means used to push the first closure means onto its seat, the invention contemplates that other equivalent but not necessarily so closely associated means can be used.

The ears 49, 50 may be duplicated by ears 60, 61 engaging other portions of rods 42, 43 so as to give more extended support for the first closure means. The connecting means between the first closure means and the wedge means further comprises the stop means provided by rod supports 62, 63, 64, 65, 66, 67 (see FIGURE 7) whereby the travel of the ears relative to the rods is limited. Furthermore, the connecting means comprises biasing means including a rod 70 (see FIGURE 3 especially) engaging an apertured ear 71, with a helical spring 72 disposed around the rod 70 between ear 71 and rod support 73, biasing the first closure downwardly relative to the wedge means. Rod supports 73 and 74 (also ears 62, 63, 64, 65, 66 and 67) may also serve as a stop to limit the travel of the first closure means relative to the wedge means. It will be noted that the biasing means urges the first closure means in the direction of the apex of the dihedral angle between the first and third bearing means. The first closure means and the wedge means form together a closure-wedge means and the biasing means may be said to urge the closure-wedge means to an extended position as shown in FIGURE 1 compared to a contracted position such as shown in FIGURE 3.

The means for controlling the motion of the first closure means from closed to unseated position further comprises constraining means for constraining the wedge means to movement relative to the wall means (valve body) in which the first and third bearing means remain in engagement while the closure means is pulled from closed to unseated position as above described. Said constraining means includes first guide means carried by the closure-wedge means, namely rollers 80, 81, 82, 83 (see especially FIGURE 7), cooperating with second guide means carried by the wall means, namely the sloping surfaces 84, 85 of guide strips 86, 87 (see especially FIGURE 5) and like surfaces on guide strips 88, 89.

The channels 93, 94 formed between the guide strips and the wall means provide in cooperation with the rollers 80—83 means for constraining the motion of the closure means between unseated and open positions which in turn forms a further portion of the actuator means for the closure means. The constraining means holds the closure means out of engagement with the valve body during motion between unseated and open position.

Additionally the actuator means includes a valve stem 101 extending through an opening in the top of the wall means. This wall means includes a bonnet 102 and the opening for the valve stem passes through the bonnet and is sealed by packing 103 compressed by threaded plug 104. The valve stem is threaded at 105 and engages internally threaded hand wheel 106 which is rotatably mounted on top of the wall means in yoke 107. Rotation of the hand wheel causes axial motion of the valve stem. The valve stem is connected at its lower end to the wedge means by connecting means (see FIGURES 3 and 7) including rollers 110, 111 engaging slot 112 providing for lateral motion of the wedge means relative to the valve stem in the direction parallel to the axis of valve seats 24, 25, i.e., the flow axis of the valve.

When the hand wheel is rotated, the valve stem reciprocates without rotating. Starting from the closed position shown in FIGURE 3, the wedge means is elevated to the position shown in FIGURE 1 during which period the first closure means is lifted off, e.g. withdrawn from, its seat. Thereafter further rotation of the hand wheel in the same direction will also elevate the first closure means, moving it up into the upper portion 120 of the valve chamber out of the direct path of fluid flow between openings 22 and 23. At the same time the wedge means will be elevated further lifting the second closure means off its slope and out of the direct path of fluid flow. The closure-wedge means is thus entirely out of the direct path of fluid flow and the valve is in the open position. Reverse rotation of the hand wheel will lower the closure-wedge means, first seating the second closure means and thereafter wedging the first closure means into fluid tight seating engagement with its seat and sliding the second closure means over its seat with a wiping motion to more tightly engage its seat.

If opening 22 is the inlet, line pressure will tend to press the second closure means against the downstream seat. There will therefore be substantially no fluid flow over the upstream seat and there will be no cutting and abrasion as the first closure means approaches its seat. Also, there will be no pressure differential across the first closure means binding it to its seat so that the valve will be easy to open. On the other hand, if opening 22 is the outlet, the line pressure will tend to hold the first closure means on its seat assisting the wedge means, making a very tight seal, and the wedging action will still cause the second closure element to engage the upstream seat tightly, and the mechanical advantage of the sloping guide surfaces 84, 85 will make it easy to lift the first closure means off its seat despite the pressure differential. The valve can therefore be used to advantage in either position relative to the direction of fluid flow.

The combination of wedging action plus conical seating action provides an exceptionally tight valve.

Turning now to FIGURES 8–11, there are shown modifications of the first closure means. In FIGURE 8 there is an annular groove 130 formed in the conical portion 33 of the closure element, with an O ring 131 disposed in the groove. The O ring is made of suitable low elastic modulus sealing material such as an oil resistant synthetic rubber compound. In FIGURE 9 there is shown a construction similar to that of FIGURE 8 with the addition of an annular metal or other wear resistant seal ring 135 disposed in groove 136 and urged outwardly by spring 137 to engage the seat 24 prior to the O ring so as to protect it against channeling and abrasion as it approaches its seat.

FIGURE 10 shows the closure element connected to back-up element 31 for rotation about the valve seat axis so that the closure element can seek a better seat and will not wear always in the same place.

FIGURE 11 shows a closure element 32' made of a material such as the O rings of FIGURE 8 and 9 and rotatably connected to the back-up element 31' by means of a center hub 130 and snap ring 131 engaging an annular groove in the hub. The closure element 32' is formed like an O ring at its outer peripheral portion 132 and is floatingly mounted by the flexible disc portion 133 thereof.

FIGURE 12 shows a modification of the valve wherein the closure wedge means of the FIGURES 1–7 embodiment are duplicated as shown at 150, 151, the two closure-wedge means being oppositely facing, and the conical and plane seats 24, 25 of the FIGURES 1–7 embodiment are likewise duplicated at 152, 153, 154, 155, thereby combining two valves in one common chamber 156, with the two valve stems 157, 158, connected to a common stem 159 for operation by a single hand wheel like that of the FIGURES 1–7 embodiment. With this construction the valve operation is the same regardless of the direction of flow; otherwise this construction is the same as that of FIGURES 1–7.

In each of the embodiments of the invention described, any suitable means may be provided at the inlet and outlet openings for connecting the valve in a flow line. For example as shown in FIGURES 1, 3 and 4 there may be provided necks around the openings suitably bevelled as at 170, 171 (FIGURE 4) for welding to pipes to be connected thereto. FIGURE 12 shows threads 173, 174 for screw connections. Flanges for bolted connections may be provided.

While preferred embodiments of the invention have been shown and described, many further modifications thereof could be made by one skilled in the art without departing from the spirit of the invention and it is desired to protect by Letters Patent all forms of the invention falling within the scope of the following claims:

1. A valve comprising
   chamber defining wall means having a plurality of openings therethrough providing an inlet and outlet for the chamber with an area around at least one of said openings providing a seat,
   closure means for engaging said seat and blocking flow through said one opening,
   actuator means for moving said closure means in a direction having at least a component parallel to the flow path through said seat between a closed position of engagement with said seat and an unseated position out of engagement with said seat but at least partially in the direct path of flow between said inlet and outlet and for moving said closure means transverse to said path between said unseated position and an open position both out of engagement with said seat and out of said path, said actuator means comprising
   wedge means for moving said closure means from said unseated position to said closed position, said wedge means having first and second bearing means acute-angularly disposed relative to each other,
   third bearings means carried by said wall means for cooperating with said first bearing means,
   fourth bearing means carried by said closure means for cooperating with said second bearing means,
   means controlling the motion of said closure means from closed to unseated position including connecting means connecting said closure means to said wedge means with said second and fourth bearing means in engagement and providing a limited amount of lost motion between said closure and wedge means with respect to relative motion in the direction of relative sliding of said second and fourth bearing maens, said connected closure means and wedge means forming a closure-wedge means, and constraining means including first guide means carried by said closure-wedge means cooperating with second guide means carried by said wall means constraining said wedge means to movement relative to said wall means in which said first and third bearing means remain in engagement while said closure means moves from said closed to unseated position.

2. The combination of claim 1 in which the first and second guide means include cooperating portions constraining said closure means to motion transverse to said flow path between said unseated and open positions.

3. The combination of claim 2 with spring means biasing said closure means to move relative to said wedge means in the direction of the apex of the dihedral angle between said first and second bearing means, anti-friction means between said closure means and said wedge means, and anti-friction means on said closure means for engaging said wall means during motion of said closure means between closed and unseated positions.

4. The combination of claim 2 in which the second guide means comprises two pairs of guide channels disposed one pair at each side of said wedge means with the channels of each pair disposed parallel to said stem axis, and the first guide means comprises two pairs of pins disposed one pair at each side of said wedge means and with one pin of each pair in one of said channels.

5. The combination of claim 2 in which said first bearing means on the wedge means is disposed generally in a plane at an angle to the plane perpendicular to the axis of said seat and said actuating means further comprises a valve stem perpendicular to said seat axis and mounted for motion in the direction of the stem axis through another opening in said wall means, and means connecting said valve stem to said wedge means providing for lateral motion of said wedge means relative to the valve stem parallel to the seat axis.

6. The combination of claim 2 in which said third bearing means surrounds a second one of said openings providing an area forming a second seat, and said first bearing means on the wedge means provides a closure means cooperable with said second seat to block flow through said second one of said openings.

7. The combination of claim 2 in which there is an area around a second one of said openings providing a second seat facing opposite to the first said seat, and there are a second closure means and second actuating means therefor like the first said closure means and actuating means except that the second closure means is engageable with the second seat, and said two actuating means for said two closure means include a common valve stem mounted for axial motion through another opening in said wall means and connected to the wedge means of each of the two actuating means.

8. The combination of claim 1 in which said closure means includes a closure element adapted to engage said seat and back-up element, said closure element being mounted on said back-up element for rotation about the seat axis.

9. The combination of claim 8 in which said closure element is made of low elastic modulus sealing material including an outer peripheral portion of O ring cross section and an inner flexible disc portion.

10. The combination of claim 1 in which said seat is recessive and said closure means includes a protuberant closure element adapted to engage within said seat.

11. The combination of claim 1 in which said seat is conical and said closure means includes a conical closure element adapted to engage said seat.

12. The combination of claim 11 in which said closure element includes a ring of low elastic modulus packing material disposed on the conical surface thereof.

13. The combination of claim 12 in which said closure element includes a wear resistant seal ring disposed around the outside of said packing material ring and resilient means urging said wear resistant seal ring outwardly beyond said packing material ring to engage said seat before said packing material ring.

References Cited in the file of this patent

UNITED STATES PATENTS

| | | |
|---|---|---|
| 4,250 | Ludlow | Jan. 31, 1871 |
| 791,173 | Anglim | May 30, 1905 |
| 1,280,451 | Hagen | Oct. 1, 1918 |
| 2,676,780 | Wheatley | Apr. 27, 1954 |